United States Patent [19]
Call

[11] Patent Number: 6,103,059
[45] Date of Patent: Aug. 15, 2000

[54] PROCESS FOR DELIGNIFICATION OF A LIGNIN CONTAINING PULP

[75] Inventor: Hans-Peter Call, Übach-Palenberg, Germany

[73] Assignee: Lignozym GmbH, Baeweiler, Germany

[21] Appl. No.: 08/682,506

[22] PCT Filed: Jun. 16, 1994

[86] PCT No.: PCT/EP94/01966

§ 371 Date: Nov. 7, 1996

§ 102(e) Date: Nov. 7, 1996

[87] PCT Pub. No.: WO94/29510

PCT Pub. Date: Dec. 22, 1994

[30] Foreign Application Priority Data

Jun. 16, 1993 [DE] Germany ............... 43 19 696

[51] Int. Cl.[7] .................. D21C 9/147; D21H 25/02
[52] U.S. Cl. ................ 162/65; 162/72; 162/76; 162/83; 435/278
[58] Field of Search ................. 162/72, 83, 76, 162/82, 65, 78; 435/277, 278

[56] References Cited

U.S. PATENT DOCUMENTS

| | | | |
|---|---|---|---|
| 3,962,033 | 6/1976 | Eriksson et al. | 162/72 |
| 4,002,526 | 1/1977 | Brown et al. | 162/72 |
| 4,213,821 | 7/1980 | Vanderhoek et al. | 162/72 |
| 4,294,653 | 10/1981 | Lindahl et al. | 162/72 |
| 4,830,708 | 5/1989 | Paice et al. | 435/278 |
| 5,203,964 | 4/1993 | Call | 162/72 |

FOREIGN PATENT DOCUMENTS

| | | |
|---|---|---|
| 9175432 | 10/1991 | Australia . |
| 4008893 | 9/1992 | Germany . |
| 8700635 | 1/1987 | WIPO . |
| 9201086 | 2/1992 | WIPO . |

OTHER PUBLICATIONS

Yang, "Bleaching of eucalyptus kraft pulp with the Enzone process", Yappi J. pp. 91–96, Jul. 1993.

Bio Engineering Apr. 1992, vol. 8, Dr. R.M. Fakoussa.

*Primary Examiner*—Steve Alvo
*Attorney, Agent, or Firm*—Collard & Roe, P.C.

[57] ABSTRACT

A process for modifying, breaking down or bleaching lignin, material containing lignin or like substances uses oxidation catalysts and suitable oxidizing agents wherein these catalysts are used in combination with aliphatic, cycloaliphatic, hetercyclic or aromatic compounds containing NO, NOH or (A).

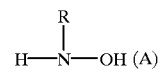

12 Claims, No Drawings

PROCESS FOR DELIGNIFICATION OF A LIGNIN CONTAINING PULP

The present invention relates to a novel process for modifying lignin-containing materials or similar substances by means of oxidation catalysts and highly effective mediators.

Industrially the most significant is the removal of lignin in the course of the production of pulp.

The sulfate and the sulfite process are to be mentioned as the processes currently chiefly used for pulp production. With both processes, pulp is produced by cooking and under pressure. The sulfate process operates with the addition of NaOH and $Na_2S$, while $Ca(HSO_3)_2+SO_2$ is used in the sulfite process.

In addition, there exist some environmentally friendly cooking processes which operate with organic solvents.

All the processes have the main aim of removing the lignin from the plant material, wood or annual plants used.

The lignin which, with the cellulose and the hemicellulose, makes up the main constituent of the plant material (stem or trunk) must be removed, since otherwise it is not possible to produce papers which are non-yellowing and can be subjected to high mechanical stress.

Wood pulp production processes operate with stone grinders (mechanical wood pulp) or with refiners (TMP), which defibrillate the wood by grinding after appropriate pretreatment (chemical, thermal or chemical-thermal).

These wood pulps still comprise most of the lignin. They are used above all for the production of newspapers, illustrated journals and the like.

The possibilities of the use of enzymes for degradation of lignin have been researched for some years. The action mechanism of such lignolytic systems was clarified only some years ago, when it became possible to obtain adequate amounts of enzyme with the white rot fungus Phanerochaete chrysosporium under suitable growing conditions with additions of inductor. The previously unknown lignin peroxidases and manganese peroxidases were discovered by this research. Since Phanerochaete chrysosporium is a very effective degrader of lignin, attempts were made to isolate its enzymes and to use them in a suitable form for lignin degradation. However, this was not successful, since it was found that the enzymes lead above all to repolymerization of the lignin and not to degradation thereof.

Similar circumstances also apply to other lignolytic enzyme species, such as laccases, which degrade the lignin oxidatively with the aid of oxygen instead of hydrogen peroxide. It was found that similar processes occur in all cases. In fact, free radicals are formed which react with one another again and thus lead to polymerization.

There are thus currently only processes which operate with in vivo systems (fungus systems); the main focal points of optimization experiments are so-called biopulping and biobleaching.

Biopulping is understood as meaning treatment of chopped wood chips with live fungus systems.

There are 2 types of forms of application:

1. Pretreatment of chopped chips before refining or grinding in order to save energy during the production of wood pulps (for example TMP or mechanical wood pulp). Another advantage is the improvement which usually exists in the mechanical properties of the pulp, but a disadvantage is the poorer final whiteness.

2. Pretreatment of chopped chips (softwood/hardwood) before cooking of the pulp (kraft process, sulfite process).

The aim here is a reduction in cooking chemicals, improvement in cooking capacity and "extended cooking".

Improved kappa reduction after cooking in comparison with cooking without pretreatment is also achieved as an advantage.

Disadvantages of these processes are clearly the long treatment times (several weeks), and above all the unsolved risk of contamination during treatment if sterilization of the chopped chips, which is uneconomical, is to be dispensed with.

Biobleaching likewise operates with in vivo systems. The cooked pulp (softwood/hardwood) is seeded with fungus before bleaching and is treated for days to weeks. Only after this long treatment time is a significant reduction in kappa number and increase in whiteness found, which renders the process uneconomical for implementation in the usual bleaching sequences.

Another application carried out usually with immobilized fungus systems is the treatment of waste waters from the manufacture of pulp, in particular bleaching waste waters, for decolorization thereof and reduction of the AOX (reduction of chlorinated compounds in the waste water caused by chlorine or chlorine dioxide bleaching stages).

It is furthermore known to employ hemicellulases and also xylanases and mannanases as "bleaching boosters".

These enzymes are said to act chiefly against the xylan which is reprecipitated after the cooking process and partly masks the residual lignin, and degradation thereof increases the accessibility of the lignin to the bleaching chemicals (above all chlorine dioxide) used in the subsequent bleaching sequences. The savings in bleaching chemicals demonstrated in the laboratory were confirmed to only a limited extent on a large scale, so that this type of enzyme can at best be classified as a bleaching additive.

Another possible use of lignolytic enzymes or fungi investigated recently has been recognized in "liquefaction of coal". Provisional studies show the main possibility of attacking and liquefying brown coal or hard coal with the aid of in vivo treatment with, for example, white rot fungi, such as Phanerochaete chrysosporium (incubation time of several weeks). (Bio-engineering 4.92. Vol. 8).

The possible structure of hard coal shows a three-dimensional network of polycyclic aromatic ring systems with a "certain" similarity to lignin structures.

Chelating substances (siderophors, such as ammonium oxalate) and biosurfactants are assumed to be a cofactor, alongside the lignolytic enzymes.

The Application PCT/EP87/00635 describes a system for removing lignin from material containing lignin-cellulose with simultaneous bleaching, which operates with lignolytic enzymes from white rot fungi with the addition of reducing and oxidizing agents and phenolic compounds as mediators.

In DE 4008893C2, "mimic substances" which simulate the active center (prosthetic group) of lignolytic enzymes are added in addition to the redox system. It was thus possible to achieve a considerable improvement in performance.

In the Application PCT/EP92/01086, a redox cascade with the aid of phenolic or non-phenolic aromatics "coordinated" in oxidation potential is employed as an additional improvement.

The limitation for use on a large industrial scale is the applicability at low pulp densities (up to not more than 4%) for all three processes, and for the last two Applications the risk of "leaching out" of metals when using chelating compounds, which can lead above all to destruction of the peroxide in the subsequent peroxide bleaching stages.

The object of the present invention, then, is to provide a process for modifying, degrading or bleaching lignin, lignin-containing material or similar substances using oxidation catalysts and suitable oxidizing agents, which has a substantially better efficiency than the processes known to date.

This object is achieved in that the catalysts are employed in combination with aliphatic, cycloaliphatic, heterocyclic or aromatic NO—, NOH— or

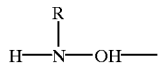

containing compounds.

The aliphatic, cycloaliphatic, heterocyclic or aromatic NO—, NOH— or

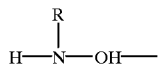

containing compounds employed in accordance with the invention are N-hydroxy, oxime, N-oxide and N-dioxide compounds, hydroxylamine, hydroxylamine derivatives, hydroxamic acids or hydroxamic acid derivatives in single- or multi-component systems. The compounds mentioned can be used in combination with phenolic compounds and/or non-phenolic compounds with one or more benzene rings and/or aromatics.

Catalysts employed in accordance with the invention are, in particular, enzymes. Among enzymes, in turn, preference is given to the oxidoreductases. These include, in particular, oxidases, peroxidases, lignin peroxidases, manganese peroxidases and laccases.

The enzymes employed are preferably those obtained from fungi, bacteria, plants and animals. Very particular preference is given in accordance with the invention to enzymes isolated from white rot fungi. These include, above all, Coriolus versicolor.

Accordingly, in the delignification of sulfate, sulfite, organic, OCC or annual-plant pulps, the liquefaction of coal or the bleaching of wood pulps, use is made very particularly of the laccases obtained from white rot fungi, especially Coriolus versicolor.

In principle, it is possible for both naturally occurring and genetically modified organisms to be enzyme producers. Likewise, parts of single-celled or multicellular organisms are conceivable as enzyme producers, especially cell cultures. Other suitable examples for the purposes of the invention are modified enzymes, enzyme constituents and prosthetic groups.

In addition to the enzymes mentioned, it is also possible to add hemicellulases, cellulases, pectinases, amylases and lipases to the reaction solution. In this case it is likewise possible to use a mixture of two or more enzymes as catalysts. Under certain circumstances, synergistic effects can occur in this context in relation to the removal of the lignin.

By virtue of the use of the abovementioned enzymes in combination with the aliphatic, cycloaliphatic, heterocyclic or aromatic NO—, NOH— or NHOH— containing compounds mentioned—referred to below as mediators—it has been possible, for example in the bleaching of sulfate pulps, to achieve the entirely surprising result of a reduction in the kappa number from 30 to 10 within from 1 to 4 hours, even at a high consistency in the region of 4 to 20%. In a further variant of the invention, the abovementioned substances can be used in combination with phenolic compounds or non-phenolic organic compounds with one or more benzene rings or aromatics.

At the same time it is possible to add reducing agents and oxidizing agents in order to establish a particular redox potential.

Reducing agents which can be employed are sodium bisulfite, sodium dithionite, ascorbic acid, thiol compounds, mercapto compounds or glutathione.

Suitable oxidizing agents may be air, oxygen, ozone, $H_2O_2$ or organic peroxides.

The reaction proceeds with the addition of oxygen or under an increased oxygen pressure in the case of laccase, and with hydrogen peroxide in the case of the peroxidases (for example lignin peroxidase or manganese peroxidase). The oxygen can also be generated here in situ, for example, by hydrogen peroxide+catalase, and the hydrogen peroxide can be generated in situ by glucose+GOD or other systems.

Agents which form free radicals or agents which trap free radicals (trapping of, for example, $OH^-$. or $OOH^-$. radicals) can, furthermore, be added to the system. These can improve the interaction between the redox and free-radical mediators.

Metal salts can also be added to the reaction solution.

These are important, in interaction with chelating agents, as agents which form free radicals or redox centers. The salts form cations in the reaction solution. Such ions are, inter alia, $Fe^{2+}$, $Fe^{3+}$, $Mn^{2+}$, $Mn^{3+}$, $Mn^{4+}$, $Cu^+$, $Cu^{2+}$, $Ti^{3+}$, $Cer^{4+}$, $Mg^{2+}$, and $Al^{3+}$.

The chelates present in the solution can furthermore serve as mimic substances for the enzymes, for example for the laccases (copper complexes) or for the lignin peroxidases or manganese peroxidases (hemocomplexes). Mimic substances are to be understood as those substances which simulate the prosthetic groups of (in this case) oxidoreductases and can catalyze, for example, oxidation reactions.

In a further variant of the invention, therefore, complexing agents are also added to the reaction solution. Particularly effective in this context has proved to be the use of the complex-forming acids ethylene-diaminetetraacetic acid (EDTA) or diethylenetriamine-pentaacetic acid (DTPA). Other iron-, manganese- or copper-complexing agents can also be mentioned at this point, for example diethylamine, hydroxylamine.

NaOCl can furthermore be added to the reaction mixture. This compound can form singlet oxygen by interaction with hydrogen peroxide.

Finally, it is also possible to operate with the use of detergents. Possible detergents are nonionic, anionic, cationic and amphoteric surfactants. The detergents can improve the penetration of the enzymes and mediators in the fiber.

It may likewise be necessary for the reaction to add polysaccharides and/or proteins. Polysaccharides which are to be mentioned here in particular are glucans, mannans, dextrans, levans, pectins, alginates or plant gums and/or intrinsic polysaccharides formed by the fungi or polysaccharides produced in the mixed culture with yeasts, and proteins which may be mentioned here in particular are gelatins and albumin.

These substances chiefly serve as protective colloids for the enzymes.

Other proteins which can be added are proteases, such as pepsin, bromelin, papain and the like. These can serve, inter alia, to achieve better access to the lignin by degradation of the extensin (a hydroxyproline-rich protein) present in wood.

Other possible protective colloids are amino-acids, simple sugars, oligomeric sugars, PEG types of the most diverse molecular weights, polyethylene oxides, polyethylene-imines and polydimethylsiloxanes.

The process according to the invention operates in the temperature range between 25 and 80° C., preferably at from 40 to 60° C. In the presence of oxygen or air, it is operated at from atmospheric pressure up to 10 bar increased pressure. The consistency range of the reaction solution is from 0.5 to 40%.

The process according to the invention can be employed not only for delignification (bleaching) of sulfate, sulfite, organosol or other pulps and of wood pulps, but also for the production of pulps generally, whether from woody or annual plants, if defibrillation by the customary cooking processes (if necessary associated with mechanical processes or pressure), i.e. a very gentle cooking, to kappa numbers which can be in the range from about 50 to 120 kappa, is ensured.

For bleaching of pulps and also for the production of pulps, the treatment can be repeated several times, either after washing and extraction of the treated pulp with NaOH or without these intermediate steps. This leads to kappa values which are considerably lower still and to considerable increases in whiteness. An $O_2$ stage can likewise be employed before the enzyme/mediator treatment, or, as has already been mentioned, an acid washing or Q stage (chelating stage) can also be carried out.

In the "liquefaction" of coal (hard coal, brown coal), a similar process procedure as for delignification (bleaching) of wood or annual plant pulp is carried out.

The invention is illustrated in more detail in the following with the aid of examples:

EXAMPLE 1

Example: Enzymatic bleaching and sulfate pulp.

30 g of bone dry pulp (softwood), pulp consistency 30% (~100 g moist) are added to the following solutions:
1) 600 mg of mediator compounds 1–10, each in separate batches, are added to 120 ml of tapwater, while stirring, and the pH is adjusted with 0.5 M $H_2SO_4$ such that pH 4.5 results after addition of the pulp and of the enzyme. 20,000 IU (IU =conversion of 1 $\mu$M syringaldazine/minute/ml of enzyme) of laccase from Coriolus versicolor are added per g of pulp. The solution is topped up to 200 ml and the pulp is added. The mixture is mixed with a dough kneader for 2 minutes.

The pulp is then introduced into a reaction bomb preheated to 45° C. and is incubated under an increased pressure of 1–10 bar for 1–4 hours.

Thereafter, the pulp is washed over a nylon screen (30 $\mu$m) and extracted for 1 hour at 60° C. at a pulp consistency of 8% with 2% of NaOH per g of pulp.

After renewed washing of the pulp, the kappa number is determined.

The results are given in Table 1.

TABLE 1

| Mediator | | kappa (pulp) before treatment | kappa (pulp) after treatment |
|---|---|---|---|
| 1 | | 28.7 | 22 |
| 2 | | 28.7 | 19.2 |
| 3 | | 28.7 | 22.3 |
| 4 | | 28.7 | 21.8 |
| 5 | | 28.7 | 21.4 |
| 6 | | 28.7 | 22 |
| 7 | | 28.7 | 19.9 |
| 8 | | 28.7 | 21.5 |
| 9 | | 28.7 | 10 |
| 10 | | 28.7 | 21.7 |
| Compounds | 1 | N,N-Dibenzylhydroxylamine | |
| | 2 | Hydroxybenzimidazole | |

TABLE 1-continued

| Mediator | | kappa (pulp) before treatment | kappa (pulp) after treatment |
|---|---|---|---|
| | 3 | Hydroxypiperidine | |
| | 4 | Quinoline oxide | |
| | 5 | Isoquinoline oxide | |
| | 6 | Hydroxypyrolidine [sic] | |
| | 7 | Hydroxyhexahydroazepine | |
| | 8 | β-(N-Oxy 1,2,3,4 tetrahydro)isoquinolino-perpionic [sic] acid | |
| | 9 | Hydroxybenzotriazole | |
| | 10 | 2,6 Dimethyl 2,6 dihydroxyl aminoheptane 4-one oxalate | |

EXAMPLE 2

Example: Enzymatic bleaching and sulfate pulp.

30 g of bone dry pulp (softwood 02 delignified), pulp consistency 30% (~100 g moist) are added to the following solution:
1) 300 mg of hydroxybenzotriazole are added to 120 ml of tapwater, while stirring. The pH is adjusted with 0.5 M $H_2SO_4$ such that pH 4.5 results after addition of the pulp and of the enzyme. 1000 or 10,000 IU (IU =conversion of 1 $\mu$M of syringaldazine/minute/ml of enzyme) of laccase from Coriolus versicolor are added per g of pulp. 1000 IU of lignin peroxidase/g of pulp, 1000 IU of peroxidase (horseradish)/g of pulp, 1000 IU of tyrosinase/g of pulp, each in separate batches. The solution is topped up to 200 ml and the pulp is added. The mixture is mixed with a dough kneader for 2 minutes.

Thereafter, the pulp is introduced into a reaction bomb preheated to 45° C. and is incubated under an increased pressure of 1–10 bar for 1–4 hours.

The pulp is then washed over a nylon screen (30 $\mu$m) and extracted for 1 hour at 60° C. at a pulp consistency of 8% with 2% of NaOH per g of pulp.

After renewed washing of the pulp, the kappa number is determined.

TABLE 2

| Enzymes | kappa (pulp) before treatment | kappa (pulp) after treatment |
|---|---|---|
| Lignin peroxidase | 15.2 | 11.3 |
| Peroxidase (horseradish) 19036 Serva | 15.2 | 11.75 |
| Thyrosinase [sic] T-7755 Sigma | 15.2 | 11.35 |
| Laccase 10,000 IU | 15.2 | 5.5 |
| Laccase 1,000 IU | 15.2 | 10.0 |

EXAMPLE 3

Example: Enzymatic bleaching and sulfate pulp.

30 g of bone dry pulp (softwood/hardwood), pulp consistency 30% (- 100 g moist) are added to the following solutions:
1) 300 mg of hydroxybenzotriazole are added to 120 ml of tapwater, while stirring, and the pH is adjusted with 0.5 M $H_2SO_4$ such that pH 4.5 results after addition of the pulp and the enzyme. 20,000 IU (IU=conversion of 1 M of syringaldazine/minute/ml of enzyme) of laccase from Coriolus versicolor are added per g of pulp. The solution is topped up to 200 ml and the pulp is added. The mixture is mixed with a dough kneader for 2 minutes.

Thereafter, the pulp is introduced into a reaction bomb preheated to 45° C. and is incubated under an increased pressure of 1–10 bar for 1–4 hours.

Thereafter, the pulp is washed over a nylon screen (30 μm) and extracted for 1 hour at 60° C. at a pulp consistency of 8% with 2% of NaOH per g of pulp.

After renewed washing of the pulp, the kappa number is determined.

A reduction in kappa number of from 15 to 6 was obtained in the case of hardwood and from 30 to 15 in the case of softwood.

EXAMPLE 4

Example: Enzymatic bleaching of straw pulp 30 g of bone dry straw pulp, pulp consistency 30% (~100 g moist) are added to the following solutions:

1) 300 mg of hydroxybenzotriazole are added to 120 ml of tapwater, while stirring, and the pH is adjusted with 0.3 M $H_2SO_4$ such that pH 4.5 results after addition of the pulp and of the enzyme. 20000 IU (IU=conversion of 1 μM of syringaldazine/minute/ml of enzyme) of laccase from Coriolus versicolor are added per g of pulp. The solution is topped up to 200 ml and the pulp is added. The mixture is mixed with a dough kneader for 2 minutes.

Thereafter, the pulp is introduced into a reaction bomb preheated to 45° C. and is incubated under an increased pressure of 1–10 bar for 1–4 hours.

The pulp is then washed over a nylon screen (30 μm) and extracted for 1 hour at 60° C. at a pulp consistency of 8% with 2% of NaOH per g of pulp.

After renewed washing of the pulp, the kappa number is determined.

A reduction in kappa number from 65 to 14 was achieved.

EXAMPLE 5

Example: Enzymatic bleaching and sulfite pulp.

30 g of bone dry pulp (sulfite pulp), pulp consistency 30% (~100 g moist) are added to the following solutions:

1) 300 mg of hydroxybenzotriazole are added to 120 ml of tapwater, while stirring, and the pH is adjusted with 0.5 M $H_2SO_4$ such that pH 4.5 results after addition of the pulp and of the enzyme. 20,000 IU (IU=conversion of 1 μM of syringaldazine/minute/ml of enzyme) of laccase from Coriolus versicolor are added per g of pulp. The solution is topped up to 200 ml and the pulp is added. The mixture is mixed with a dough kneader for 2 minutes.

Thereafter, the pulp is introduced into a reaction bomb preheated to 45° C. and is incubated under an increased pressure of 1–10 bar for 1–4 hours.

The pulp is then washed over a nylon screen (30 μm) and extracted for 1 hour at 60° C. at a pulp consistency of 8% with 2% of NaOH per g of pulp.

After renewed washing of the pulp, the kappa number is determined.

A reduction in kappa number from 15.5 to 5.2 was achieved.

EXAMPLE 6

Enzymatic bleaching of sulfate pulp (softwood/$O_2$ delignified/hardwood (2-fold treatment))

30 g of bone dry pulp (hardwood or softwood), pulp consistency 30% (~100 g moist) are added to the following solutions:

1) 300 mg of hydroxybenzotriazole are added to 120 ml of tapwater, while stirring, and the pH is adjusted with 0.5 M $H_2SO_4$ such that pH 4.5 results after addition of the pulp and of the enzyme. 20,000 IU (IU=conversion of 1 μM of syringaldazine/minute/ml of enzyme) of laccase from Coriolus versicolor are added per g of pulp. The solution is topped up to 200 ml and the pulp is added. The mixture is mixed with a dough kneader for 2 minutes.

Thereafter, the pulp is introduced into a reaction bomb preheated to 45° C. and is incubated under an increased pressure of 1–10 bar for 1–4 hours.

The pulp is then washed over a nylon screen (30 μm) and extracted for 1 hour at 60° C. at a pulp consistency of 8% with 2% of NaOH per g of pulp.

a) Directly after the incubation, enzyme+mediator are added, without a washing step, the mixture is mixed (2 minutes) and the reaction is carried out again (same metering as in the first treatment.

b) Directly after the incubation, after the washing step and pressing out of the pulp to a pulp consistency of 30%, the reaction is carried out again by adding all the components.

c) After renewed washing of the pulp, after extraction and pressing off of the pulp to a pulp consistency of 30%, the reaction is carried out again by adding all the components.

| Hardwood: reduction in kappa number | Softwood: reduction in kappa number |
|---|---|
| a) 15 to 5 | a) 15.5 to 4.2 |
| b) 15 to 3.5 | b) 15.5 to 3 |
| c) 15 to 2.5 | c) 15.2 to 2.2 |

EXAMPLE 7

Example: Enzymatic bleaching of mechanical wood pulp 30 g of bone dry mechanical wood pulp (spruce), pulp consistency 30% (- 100 g moist) are added to the following solutions:

1) 300 mg of N-hydroxyhexahydroazepine are added to 120 ml of tapwater, while stirring, and the pH is adjusted with 0.5 M $H_2SO_4$ such that pH 4.5 results after addition of the pulp and of the enzyme. 1000 IU (IU=conversion of 1 μM of syringaldazine/minute/ml of enzyme) of laccase from Coriolus versicolor are added per g of pulp. The solution is topped up to 200 ml and the pulp is added. The mixture is mixed with a dough kneader for 2 minutes.

Thereafter, the pulp is introduced into a reaction bomb preheated to 45° C. and is incubated under an increased pressure of 1–10 bar for 1–4 hours.

The pulp is then washed over a nylon screen (30 μm).

An increase in whiteness of 7% ISO whiteness was to be achieved.

EXAMPLE 8

Example: Enzymatic "liquefaction" of brown coal 30 g of bone dry ground brown coal (-200–500μparticle size) are added to the following solutions:

1) 600 mg of hydroxybenzotriazole are added, while stirring, to 120 ml of tap water, and the pH is adjusted with 0,5 M $H_2SO_4$ such that a pH of 4.5 results after addition of the ground coal and of the enzyme. 20,000 IU (IU=conversion of 1 μM syringaldazine/minute/ml of enzyme) of laccase from Coriolus versicolor are added per g. The solution is topped up to 200 ml is added to the brown coal is added. Mixing is carried out for 2 minutes.

Thereafter, the solution is introduced into a reaction bomb preheated to 45° C. and is incubated under an increased pressure of 1–10 bar for 1–4 hours.

The liquefied carbon is removed from the bomb.

What is claimed is:

1. A process for delignification of a lignin containing pulp comprising the steps of providing an aqueous liquid containing said lignin containing pulp;

adding laccase as an oxidoreductase enzymatic oxidation catalyst and oxygen as an oxidizing agent to said aqueous liquid;

adding into said aqueous liquid an effective amount of a mediator compound which is hydroxybenzotriazole, and delignifying the pulp with the aqueous liquid containing the catalyst, oxidizing agent and mediator.

2. The process as claimed in claim 1, wherein the pH is between 2 and 9 during the delignification of the pulp.

3. The process as claimed in claim 1, wherein the temperature is between 25° C. and 80° C. during the delignification of the pulp.

4. The process as claimed in claim 1, comprising adding a detergent to the aqueous liquid.

5. The process as claimed in claim 4, wherein the detergent is selected from the group consisting of a nonionic surfactant, an ionic surfactant, anionic surfactant, cationic surfactant, and an amphoteric surfactant.

6. The process as claimed in claim 1, further comprising adding a polysaccharide, a protein or a mixture thereof to the aqueous liquid.

7. The process as claimed in claim 6, wherein said polysaccharide is selected from the group consisting of glucan, mannan, dextran, levan, pectin, alginate, plant gum, an intrinsic polysaccharide formed by fungi, a polysaccharide produced in a mixtured culture with yeast and the mixtures thereof.

8. The process as claimed in claim 6, wherein said protein is selected from the group consisting of a gelatin, an albumin, and the mixtures thereof.

9. The process as claimed in claim 1, further comprising adding a simple sugar, oligomeric sugar, amino acid, polyethylene glycol, polyethylene oxide, polyethyleneimine and polydimethylsiloxane to the aqueous liquid.

10. The process as claimed in claim 1, further comprising adding an agent which forms free radicals or an agent which traps free radicals to the aqueous liquid.

11. The process as claimed in claim 1, further comprising adding to the aqueous liquid sodium bisulfite as a reducing agent, adding to the aqueous liquid hemicellulase as an enzyme, adding to the aqueous liquid ethylenediamine tetraacetic acid (EDTA) as a complexing agent.

12. The process as claimed in claim 1, comprising carrying out the delignification of pulp containing lignin after a sulfate cooking process.

* * * * *

UNITED STATES PATENT AND TRADEMARK OFFICE
CERTIFICATE OF CORRECTION

PATENT NO. : 6,103,059
DATED : August 15, 2000
INVENTOR(S) : Hans-Peter Call-2 (PCT)

It is certified that error appears in the above-identified patent and that said Letters Patent is hereby corrected as shown below:

On the Title page:
Column 1,
Item [73], change the city of the assignee to read:
--Baesweiler--.

Signed and Sealed this

Twelfth Day of June, 2001

*Nicholas P. Godici*

Attest:

Attesting Officer

NICHOLAS P. GODICI
*Acting Director of the United States Patent and Trademark Office*